Figure 1:
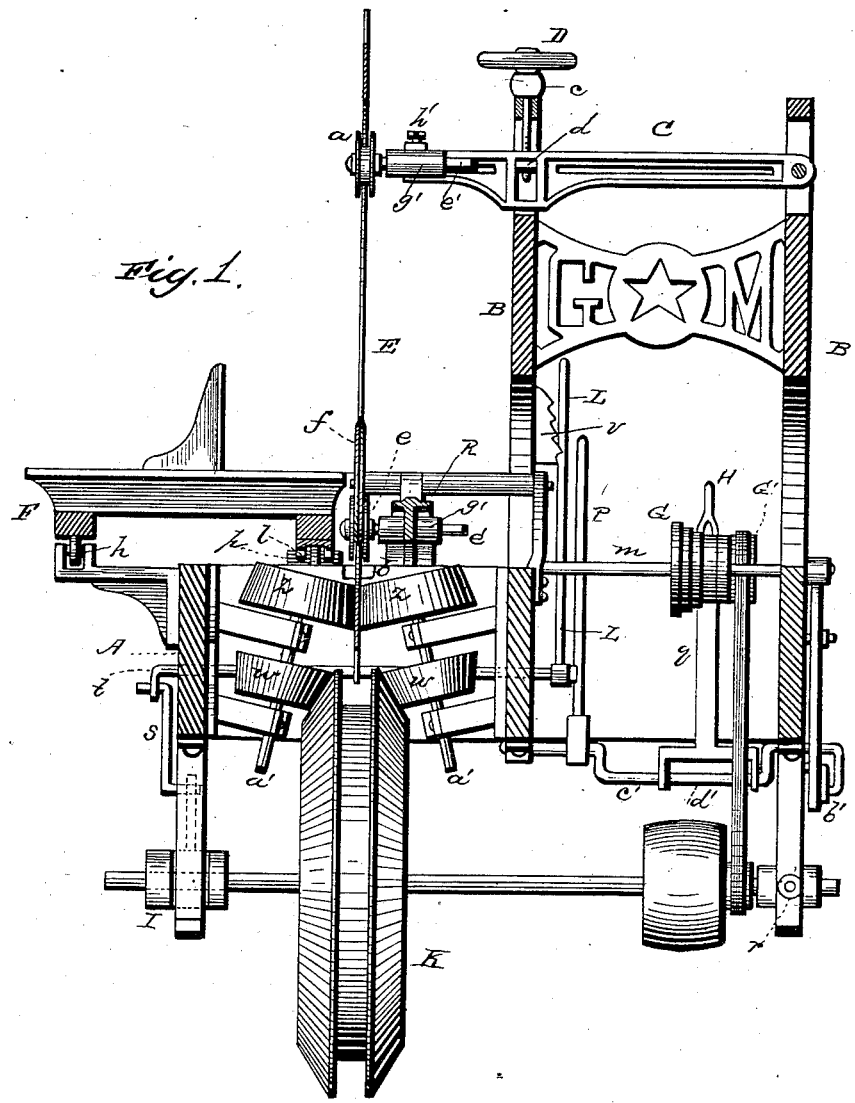

(No Model.) 3 Sheets—Sheet 1.

J. B. GORRELL & J. MILLER.
CIRCULAR SAW MILL.

No. 294,221. Patented Feb. 26, 1884.

WITNESSES
E. H. Bates
John T. Morrow

INVENTORS
Jno. B. Gorrell,
Jno. Miller,
by Anderson & Smith
their ATTORNEYS

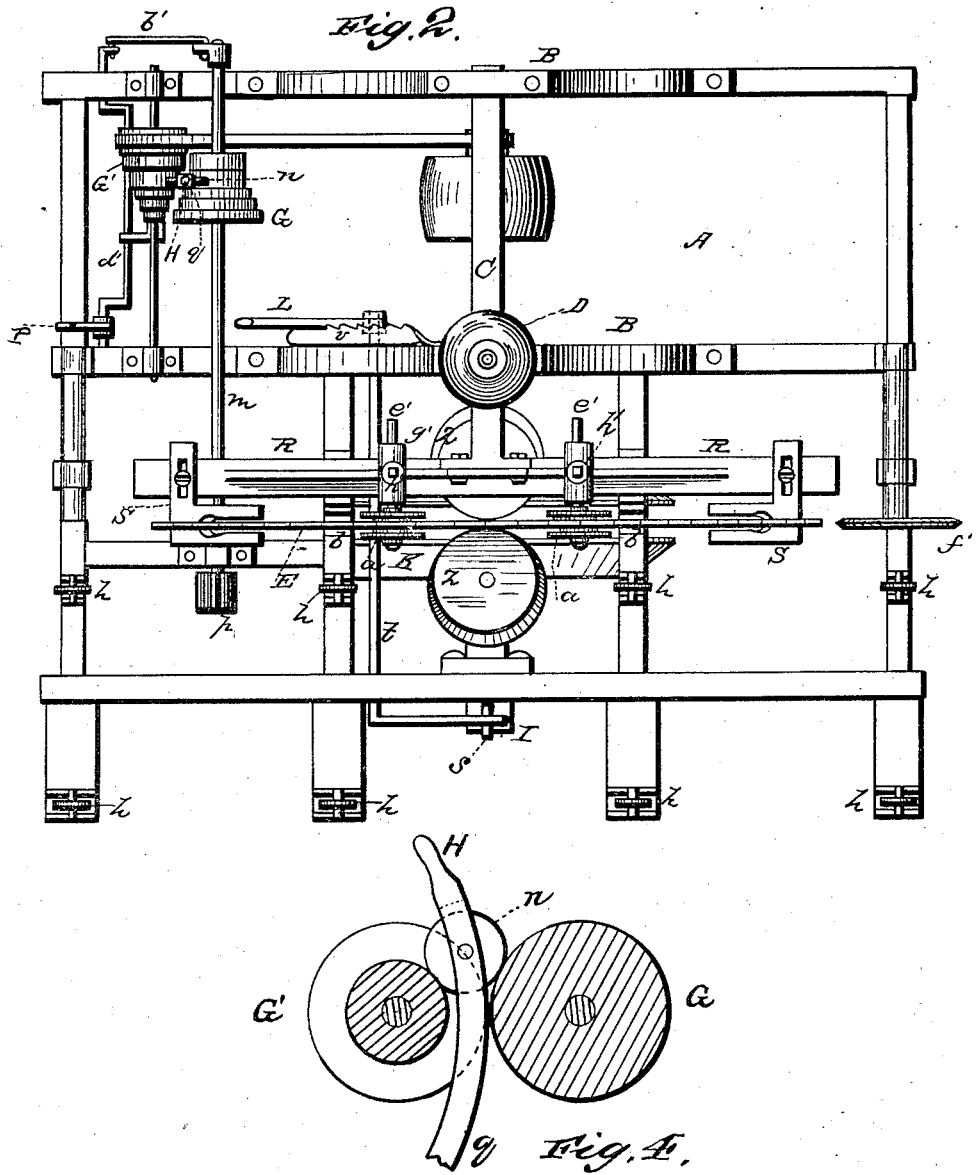

(No Model.) 3 Sheets—Sheet 3.
J. B. GORRELL & J. MILLER.
CIRCULAR SAW MILL.
No. 294,221. Patented Feb. 26, 1884.
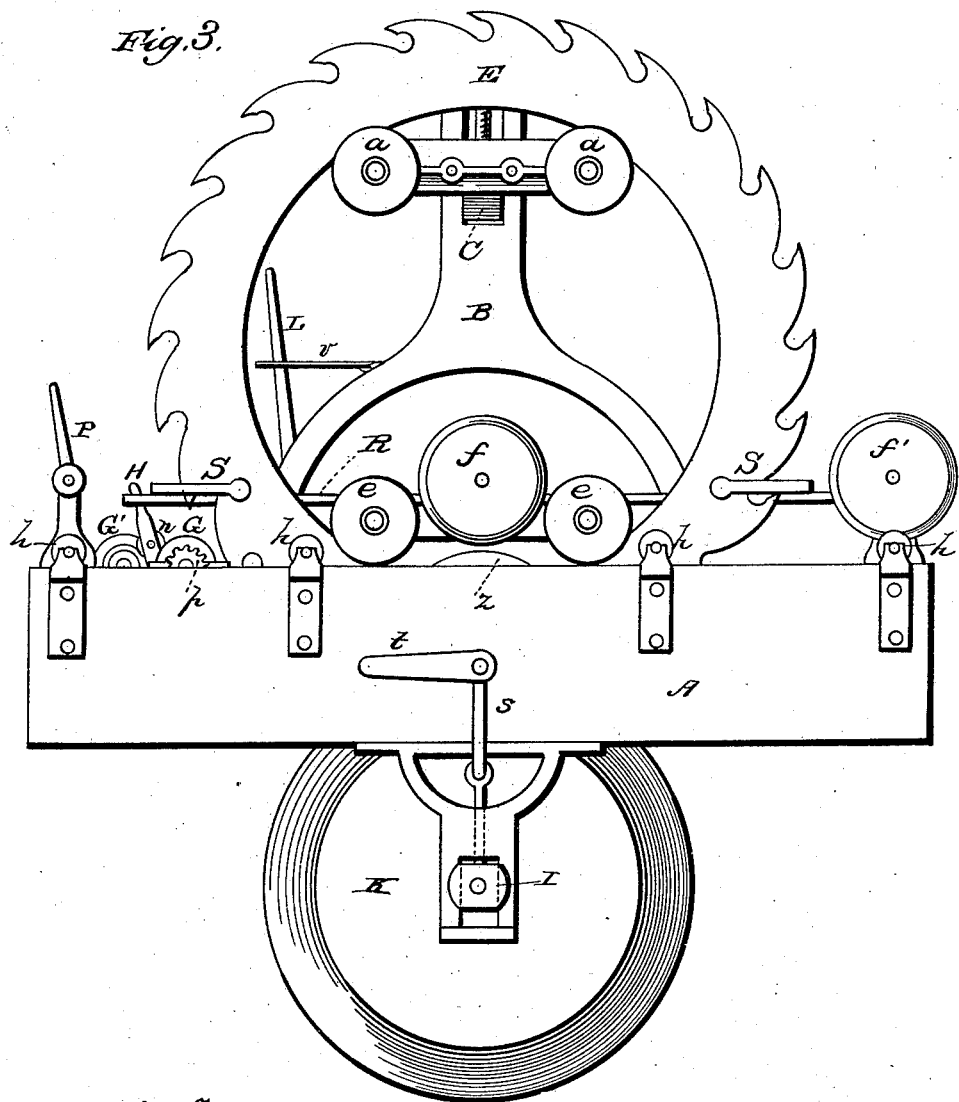
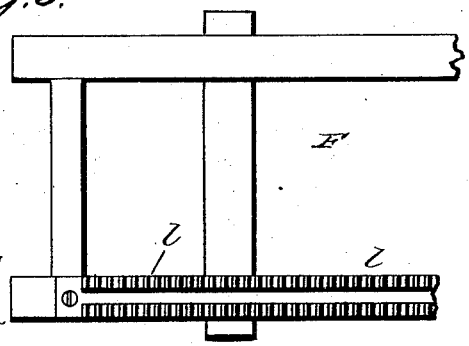

UNITED STATES PATENT OFFICE.

JOHN B. GORRELL AND JOHN MILLER, OF LA OTTO, INDIANA.

CIRCULAR SAW MILL.

SPECIFICATION forming part of Letters Patent No. 294,221, dated February 26, 1884.

Application filed May 19, 1883. (No model.)

*To all whom it may concern:*

Be it known that we, JOHN B. GORRELL and JOHN MILLER, citizens of the United States, residents of La Otto, in the county of Noble and State of Indiana, have invented certain new and useful Improvements in Saw-Mills; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a vertical cross-sectional view. Fig. 2 is a plan view. Fig. 3 is a face view, and Figs. 4 and 5 are detail views.

This invention has relation to improvements in circular sawing machines; and it consists in the construction and novel arrangement of parts, as will be hereinafter more fully set forth and claimed.

In the accompanying drawings, the letter A designates the bed-frame of the saw-mill, which is provided with bearings below for the drive mechanism.

B B indicate uprights on the frame, which support a transverse arm, C, the end of which carrying the grooved rollers $a$ $a$ overhangs the saw slot or way $b$ in the bed. The transverse arm C is pivoted at its outer end, and is adjustable, being moved by the screw D, which is provided with an elastic or yielding bearing, $c$, and engages by its lower end a threaded bearing or nut, $d$, of the arm C. By means of the yielding bearing $c$, the grooved rollers, which support the saw by its upper portion, are enabled to give or yield or to rise so that they accommodate themselves automatically to the contraction or expansion of the annular saw-blade E. The saw is arranged with its broad middle portion above the bed, and without bearing or obstruction, it being engaged by the grooved bearing-rollers $a$ $a$ above and by the grooved rollers $e$ $e$ at its lower portion.

Between the lower rollers, $e$ $e$, is arranged a spreading-disk or dividing guide-wheel, $f$, which is in the plane of the saw-blade, and is designed to engage the kerf of the log being sawed, to keep it true, so that as the log moves by the middle portion of the saw the kerf will receive the ascending limb thereof, and will not be liable to strike it. A similar guiding-disk, $f'$, is usually arranged in the plane of the saw, but beyond the same, as shown in the drawings.

F indicates the log-carriage, and $h$ $h$ the track-rollers on which it bears, its rack $l$ engaging the pinion $p$, which is secured to the transverse shaft $m$. On the outer end of this shaft is a conical differential friction-pulley, G, which is located alongside a second conical differential pulley, G', which is adjustable to or from the pulley G by means of a lever-bearing, $b'$, connected to a bent rock-shaft, $c'$, having an operating-lever, P. Intermediately arranged between and above the differential pulleys is a narrow wheel, $n$, which is journaled in a movable arm, $q$, having a handle, H, whereby it can be adjusted between any two complementary bearings of the differential wheels, according to the speed desired for the log-carriage in running it up. In running the carriage back the differential pulleys are brought into contact with each other. The arm $q$ of the wheel $n$ is connected to the bent or crank portion $d'$ of the rock-shaft $c'$, so that when the differential pulleys are separated the wheel $n$ is drawn down to engage them.

K indicates a double-bevel driving-wheel, which is seated in bearings of an adjustable arm or frame, I, pivoted at $r$, and having its movable end connected to a lever, $s$, which is in turn connected to a shaft, $t$, which is operated by a lever, L. A catch-rack, $v$, serves to hold the lever L to its adjustment.

Above the double-bevel friction-wheel K are the bevel friction-pinions $w$ $w$, which are inclined and engage the bevels of the drive-wheel K. The pinions $w$ $w$ are secured on inclined shafts $a'$ $a'$, which extend upward in line with the center of figure of the annular saw. The shafts $a'$ $a'$ bear on their upper ends the bevel friction-wheels $z$ $z$, which are designed to engage the sides of the annular saw-blade. The drive mechanism is below the level of the log-carriage, so that it does not in any manner interfere with the movement of the carriage and log thereon in the direction of the plane of the saw-blade. The action of the saw is therefore free and unobstructed from end to end of the log as it is fed forward by the carriage.

In order to put the saw in motion, the drive-wheel K is raised to engage the pinions of the bevel-wheels $z\ z$. This engagement raises the shafts $a'\ a'$ and causes the bevel-wheels $z\ z$ to move upward and inward to engage or clamp the saw-blade and rotate the same. When the drive-wheel is depressed, the bevel-wheels and their shafts fall, and the saw-blade becomes disengaged from said bevel-wheels, so that it stops almost immediately.

The grooved bearing-rollers $a\ a$ and $e\ e$ are mounted on pins $e'$, which are located in tubular seats $g'$, having set-screws $h'$, engaging perforations thereof. The pins can be easily adjusted with reference to the plane of the saw, and are held after adjustment by the set-screws.

The lower grooved rollers, $e'\ e'$, are connected by their pin-bearings to a low horizontal arm, R, of the frame, which also supports the spreader-disk and the saw-guide S. This arm is about on a level with the log-carriage, and is designed to economize timber in constructing the bed-frame.

Having described this invention, what we claim, and desire to secure by Letters Patent, is—

1. In a circular sawing machine, the combination, with the annular saw and its bearing-rollers, with means, substantially as described, for adjusting the same, of the kerf-dividing disks and saw-actuating mechanism, as specified.

2. In a circular sawing machine, the combination, with the double-bevel friction-wheel K, of the bevel friction-pinions $w$, engaging the same, and the bevel friction-wheels $z$, engaging the sides of the annular blade, with mechanism for adjusting the same, substantially as specified.

In testimony whereof we affix our signatures in presence of two witnesses.

JOHN B. GORRELL.
JOHN MILLER.

Witnesses:
J. J. SHEEHY,
EMORY H. BATES.